US008352916B2

(12) United States Patent
Ahluwalia et al.

(10) Patent No.: US 8,352,916 B2
(45) Date of Patent: Jan. 8, 2013

(54) FACILITATING THE AUTOMATED TESTING OF DAILY BUILDS OF SOFTWARE (75) Inventors: Vikas Ahluwalia, Kirkland, WA (US); Arun Batish, Beaverton, OR (US); Thomas M. Carlier, Beaverton, OR (US); Manoj K. Negi, Beaverton, OR (US); Vipul Paul, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 1675 days.

(21) Appl. No.: 11/357,549

(22) Filed: Feb. 17, 2006

(65) Prior Publication Data

US 2007/0204262 A1    Aug. 30, 2007

(51) Int. Cl.
G06F 9/44       (2006.01)
G06F 9/445      (2006.01)

(52) U.S. Cl. ......... 717/124; 717/169; 717/170; 717/175

(58) Field of Classification Search .................. None
See application file for complete search history.

(56) References Cited

U.S. PATENT DOCUMENTS

| | | | | | |
|---|---|---|---|---|---|
| 5,586,304 | A | * | 12/1996 | Stupek et al. | 717/170 |
| 5,715,463 | A | * | 2/1998 | Merkin | 717/175 |
| 6,959,433 | B1 | | 10/2005 | Morales et al. | 717/127 |
| 6,971,018 | B1 | * | 11/2005 | Witt et al. | 713/187 |
| 7,584,467 | B2 | * | 9/2009 | Wickham et al. | 717/171 |
| 7,624,391 | B2 | * | 11/2009 | Boldon et al. | 717/169 |
| 7,624,392 | B2 | * | 11/2009 | Bando | 717/169 |
| 7,882,352 | B2 | * | 2/2011 | Dive-Reclus et al. | 713/164 |
| 8,166,458 | B2 | * | 4/2012 | Li et al. | 717/124 |
| 2002/0129353 | A1 | * | 9/2002 | Williams et al. | 717/175 |
| 2003/0088866 | A1 | * | 5/2003 | Boldon et al. | 717/170 |
| 2003/0204784 | A1 | * | 10/2003 | Jorapur | 714/38 |
| 2004/0060035 | A1 | * | 3/2004 | Ustaris | 717/100 |
| 2004/0060044 | A1 | * | 3/2004 | Das et al. | 717/171 |
| 2004/0078565 | A1 | * | 4/2004 | Hofmeister et al. | 713/156 |
| 2004/0078692 | A1 | | 4/2004 | Jackson et al. | 714/38 |
| 2004/0187103 | A1 | * | 9/2004 | Wickham et al. | 717/168 |
| 2005/0015702 | A1 | | 1/2005 | Shier et al. | 714/776 |
| 2005/0223219 | A1 | * | 10/2005 | Gatto et al. | 713/156 |
| 2006/0209328 | A1 | * | 9/2006 | Anderson et al. | 358/1.13 |
| 2006/0294511 | A1 | * | 12/2006 | Bartley et al. | 717/168 |
| 2007/0168970 | A1 | * | 7/2007 | Li et al. | 717/124 |
| 2007/0234293 | A1 | * | 10/2007 | Noller et al. | 717/124 |
| 2008/0127225 | A1 | * | 5/2008 | Mullis et al. | 719/321 |

OTHER PUBLICATIONS e-gate USB Smart Card Drivers Install/Update/Downgrade/Uninstall Notes, Version 1.0, Schlumberger, Inc., Oct. 23, 2003, pp. 1-21.*
Microsoft, "Unattended Install is Halted by Windows Logo Testing Warning During Device Detection Phase", Microsoft Support [online], 2006 [retrieved Mar. 16, 2012], Retrieved from Internet: <http://support.microsoft.com/kb/293765>, pp. 1-2.*

* cited by examiner

Primary Examiner — Isaac Tecklu
Assistant Examiner — Todd Aguilera
(74) Attorney, Agent, or Firm — Steven L. Bennett, Esq.; Blanche E. Schiller, Esq.; Heslin Rothenberg Farley & Mesiti P.C.

(57) ABSTRACT

Automated testing of software builds having updated signature required modules, such as plug and play devices, is facilitated. A build (e.g., a daily build) of the software is performed, which includes one or more updated signature required modules. These modules are included within the build, even though the modules are unsigned. Automated testing is then performed against the daily builds.

18 Claims, 6 Drawing Sheets fig. 1 fig. 2A fig. 2B fig. 3A fig. 3B fig. 4

FACILITATING THE AUTOMATED TESTING OF DAILY BUILDS OF SOFTWARE

TECHNICAL FIELD

This invention relates, in general, to the testing of software modules, and in particular, to facilitating the automated testing of daily builds of software having signature required modules, such as plug and play modules.

BACKGROUND OF THE INVENTION

Testing of the latest available code is paramount to the reliability and trustworthiness of the code. In some testing environments, builds of the source code are performed daily to enable the latest available code to be tested. However, an issue arises when a build includes drivers that require signatures.

In particular, various drivers, such as plug and play (PnP) drivers, offered by Microsoft Corporation, Redmond, Wash., have a requirement that they be certified by Microsoft®, when they are installed. (Microsoft® is a registered trademark of Microsoft Corporation.) To obtain certification by Microsoft®, a vendor uploads files of the driver to a Microsoft® website, signs various agreements and downloads a signed catalog file. This takes a day or more. This is required each time the driver is rebuilt, which may be on a daily basis during the development cycle.

Since a PnP driver needs to be signed each time it is rebuilt, testing of the latest code is delayed by a day or more. Further, the daily build and/or test requires human intervention, and thus, cannot be fully automated.

SUMMARY OF THE INVENTION

Based on the foregoing, a need exists for an enhanced capability to facilitate automated testing of daily builds of software that include signature required modules.

The shortcomings of the prior art are overcome and additional advantages are provided through the provision of a method of software testing. The method includes, for instance, obtaining one or more updated versions of one or more signature required modules; and building a setup package to be tested that includes the one or more updated versions of the one or more signature required modules. The building includes the one or more updated versions in the setup package absent a signing of the one or more updated versions. The one or more updated versions of the one or more signature required modules are able to be tested absent the signing.

In a further aspect of the present invention, a method of facilitating software testing is provided. The method includes, for instance, building a setup package to be tested that includes one or more updated versions of one or more signature required modules, the building including the one or more updated versions in the setup package absent a signing of the one or more updated versions, and wherein the one or more updated versions of the one or more signature required modules are able to be tested absent the signing; and executing the setup package on a processing unit to enable automated testing of the setup package, wherein the building and executing are automated and are performable daily.

System and computer program products corresponding to one or more of the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In one aspect of the present invention, a capability is provided for facilitating automated testing of daily builds of software having modules (e.g., drivers and/or utilities) that require signing prior to being used (i.e., signature required modules). Examples of signature required modules are plug and play (PnP) modules, offered by Microsoft Corporation, Redmond, Wash., which include, for instance, device drivers, disks, mice, keyboards, etc; and system device drivers, as well as others. A technique is provided in which updated signature required modules can be automatically tested daily without human intervention. These updated signature required modules are current modules, in that they are not delayed by a day or more in the testing.

Figure 1:
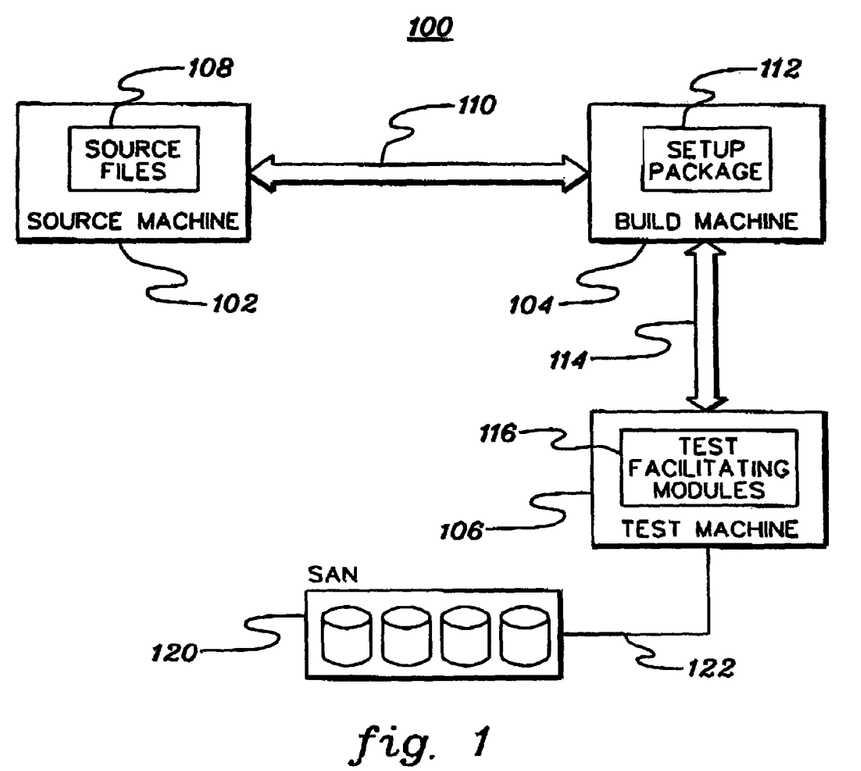
FIG. 1 depicts one embodiment of a processing environment incorporating and using one or more aspects of the present invention.

The testing is performed, for example, in a testing environment, such as a storage area network (SAN) file system build and test environment 100 (FIG. 1). The environment includes, for instance, a plurality of processing units, such as a source machine 102, a build machine 104 and a test machine 106. Each machine may be, for instance, a server, such as an xSeries® server offered by International Business Machines Corporation, Armonk, N.Y. ("xSeries" is a registered trademark of International Business Machines Corporation.) Each server includes, for example, a central processing unit, storage (e.g., main memory) and one or more input/output (I/O) devices) coupled to one another via, for example, one or more buses. Each server executes an operating system, such as a Windows® 2003 operating system, offered by Microsoft Corporation. As examples, the servers execute the same or different operating systems from one another. ("Windows" is a registered trademark of Microsoft Corporation.)

Source machine 102 stores, maintains and manages various source files 108 from which modules are selected and tested. It is coupled to build machine 104 via a network 110. Build machine 104 accesses one or more source files from the source machine using, for instance, a source control software, and builds a setup package 112, as described below.

Subsequent to building the setup package, the build machine copies this latest package onto test machine 106 via a network 114. This setup package is run on the test machine to install the software modules that need to be tested. Network 114 and network 110 include any type of suitable network including, for instance, a wide area network (WAN), a local area network (LAN), the Internet or any other suitable network.

The test machine includes test facilitating modules 116 to facilitate the testing of daily builds of software. The test machine is connected to a storage area network (SAN) 120 via, for instance, a fiber network 122. The test machine tests the modules of a given software product. In one example, this product allows a machine to use SAN. Further details regarding the testing are described below.

Test facilitating modules 116 are used to test various software modules, including modules that do not require signing before being used and those that require signing. For instance, plug and play (PnP) drivers, offered by Microsoft Corporation, require signing prior to being used. The signing by a particular company/vendor identifies the drivers that are being signed as being issued by that company/vendor and having passed testing by that company/vendor. As an example, a driver signed by Microsoft Windows Hardware Quality Lab (WHQL) identifies the driver as having passed testing by WHQL.

In one example, driver signing performed by Microsoft Corporation includes using existing digital signature cryptographic technology to store identifying information in a catalog file (*.cat, or CAT file). CAT files are stored in <Windir>\Catroot. No change is made to the driver binary itself. Instead, a CAT file is created for each driver package and the CAT file is signed with a Microsoft digital signature. The relationship between the driver package and its CAT file is referenced in the driver's INF file, and is maintained by the computer after the driver is installed.

Testing is performed on, for instance, software modules that are from one or more common source files and developed by one or more developer teams either at one location or geographically dispersed. A complete solution includes one or more modules, which may or may not be built off of common source files. Regardless of the manner in which they are built, the modules of a solution are tested together to ensure accurate performance. A solution is the suite of software to be installed on a machine to perform one or more functions.

The procedure used to test the software modules depends on whether signature required modules are to be tested. If there are no signature required modules to be tested, then the test sequence includes, for instance, uninstalling old (i.e., previous versions of) software modules from the test machine; installing the new software modules to be tested on the test machine; rebooting or restarting the test machine; and launching the tests.

However, if the test modules include signature required modules, then, in accordance with an aspect of the present invention, the test sequence includes, for instance: uninstalling old software modules (except for signature required modules) from the test machine using a special switch (e.g., parameter); installing new software modules to be tested and replacing the signature required files, again via the special switch; rebooting or restarting the test machine; and launching the tests.

In one example, the above procedures for both the no signature required modules and the signature required modules can be performed automatically and in real-time. Even updated signature required modules are tested without delay (i.e., without the typical delay of a day or more needed for signature). This allows the testing to be performed contemporaneously with the changes (e.g., daily or at any other desired time interval).

Further details regarding the testing of modules, including signature required modules, are described with reference to FIGS. 2a-4. In the examples described herein, PnP modules are referred to, which are examples of signature required modules. However, other types of signature required modules can be used and/or benefit from one or more aspects of the present invention.

Figure 2A:
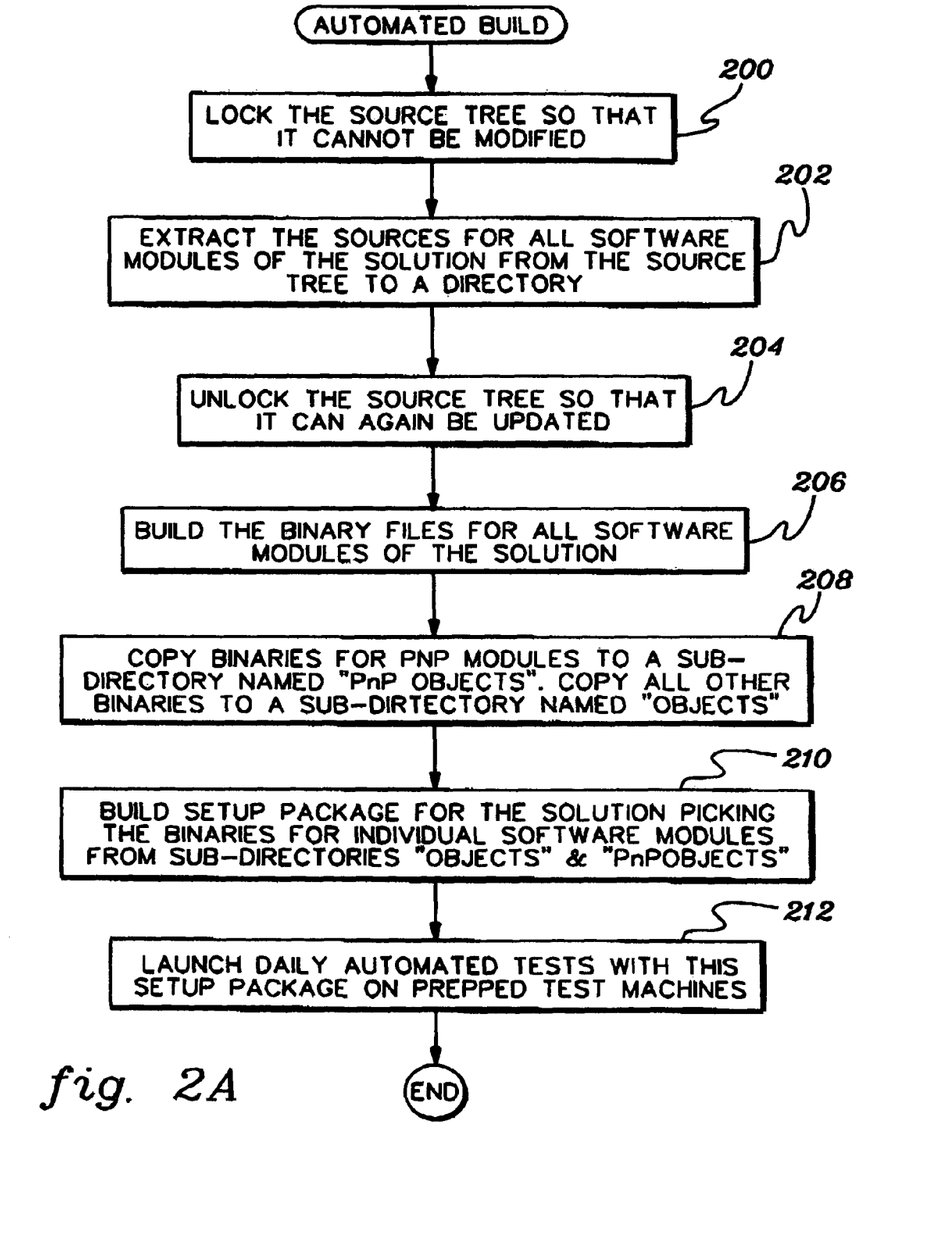
FIGS. 2a-2b depict one embodiment of the logic associated with an automated build process, in accordance with an aspect of the present invention.

Referring to FIG. 2a, one embodiment of the logic associated with an automated build process is described. This automated build process executes, for instance, on the build machine and builds a setup package for a solution that includes signature required modules. These modules have been previously installed (i.e., earlier versions have been installed), but updated versions of the modules are included in the new build. The build is automated and includes the most up-to-date versions of the modules.

Initially, a source tree that is located in storage of the source machine and accessible to the developers is locked so that it cannot be modified, STEP 200. This tree is a master tree that includes the various software modules to be tested and is controlled by a source control system, in one embodiment. Subsequent to locking the tree, the sources for the software modules of the solution to be tested are extracted from the source tree and placed in a directory located in storage of the build machine. This extraction is performed using, for instance, source control tools, such as the Configuration Management and Version Control Tool, offered by International Business Machines Corporation, STEP 202. The source tree is then unlocked, so that it can be updated, once again, STEP 204.

For the software modules of the solution that are in the directory and are to be tested, binary files of those modules are built, STEP 206. The binaries are built by, for instance, compiling and linking the code, as is known. Thereafter, any binaries for PnP modules are copied to a subdirectory, referred to herein as "PnPObjects." Any other binaries are copied to a subdirectory named "Objects," STEP 208. A run setup package is then built for the solution to be tested by selecting the binaries for individual software modules of the solution to be tested from the "Objects" subdirectory and the PnP Objects subdirectory, STEP 210. In one example, an installation packaging software, such as InstallShield Development Studio offered by Macrovision Corporation, Santa Clara, Calif., is used to package the binary files into a program. This setup package, referred to herein as the run setup package, is an executable program that is used to install individual modules onto the test machine(s). It is possible to execute this program in different ways by running it with different switches. The run setup package is used in the launch of daily automated tests on prepared test machines, as described below, STEP 212.

Figure 2B:
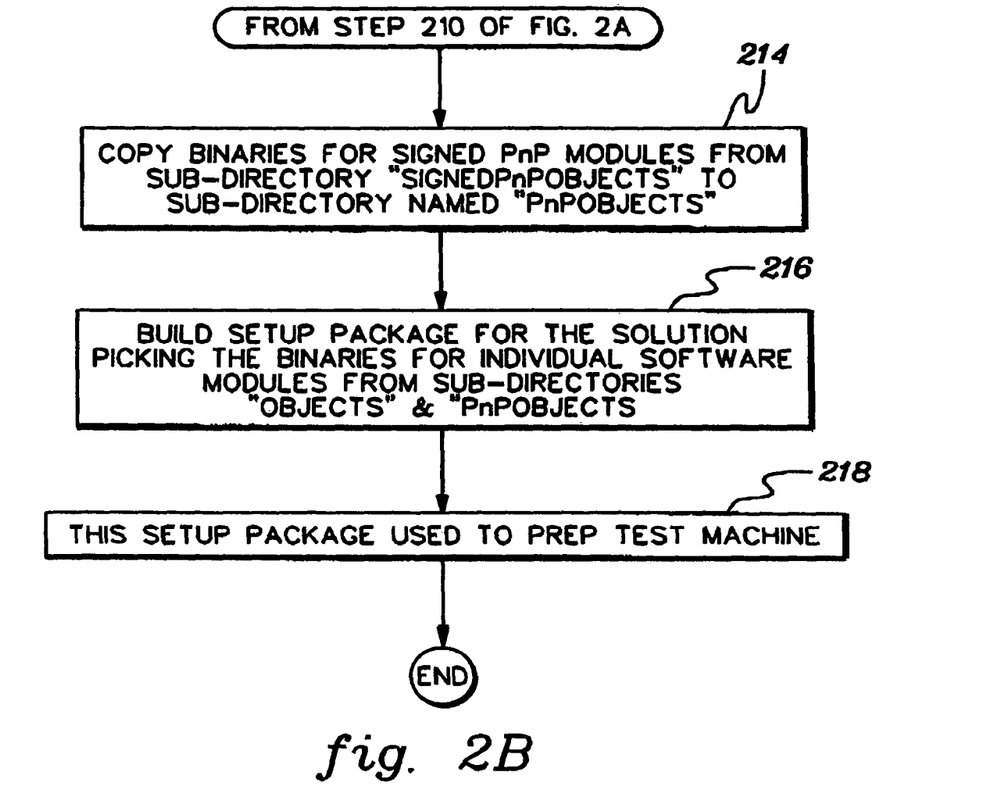

Additionally, after the run setup package is built in STEP 210, processing continues with copying binaries for signed PnP modules from a subdirectory named "SignedPnPObjects" (described below) to the "PnPObjects" subdirectory, STEP 214 (FIG. 2b). A prep setup package for the solution is then built selecting the binaries for individual software modules of the solution to be tested from the "Objects" subdirectory and the "PnPObjects" subdirectory, STEP 216. This setup package, referred to herein as the prep setup package, is then used to prepare test machines for automated testing, as described below, STEP 218.

In one embodiment, the above build process may be performed daily. It is automated, requiring no human intervention, and is capable of including the most up-to-date software modules. That is, there is no delay due to waiting for signatures for updated signature required modules. Instead, even those updated modules that need signature authorization are included in the build.

The updated modules that require signature are then signed at a later time. For example, a weekly or bimonthly schedule is implemented during the testing process to sign the modules that require signing. In one particular implementation, the PnP modules in the "PnPObjects" directory are digitally signed and copied to the "SignedPnPObjects" subdirectory. This digital signing is manually performed, in one embodiment. By enabling the signatures to be obtained at a later time, instead of at each time the module is updated, testing is not delayed and it can be performed automatically.

One embodiment of the logic associated with preparing test machines is described with reference to FIGS. 3a-3b. A portion of this logic is manually performed, as indicated in FIG. 3b, but the remainder of the logic is performed automatically on the test machine. A test machine is prepared only once with the prep setup package, and thereafter, the run setup package is executed to perform the daily testing.

Figure 3A:
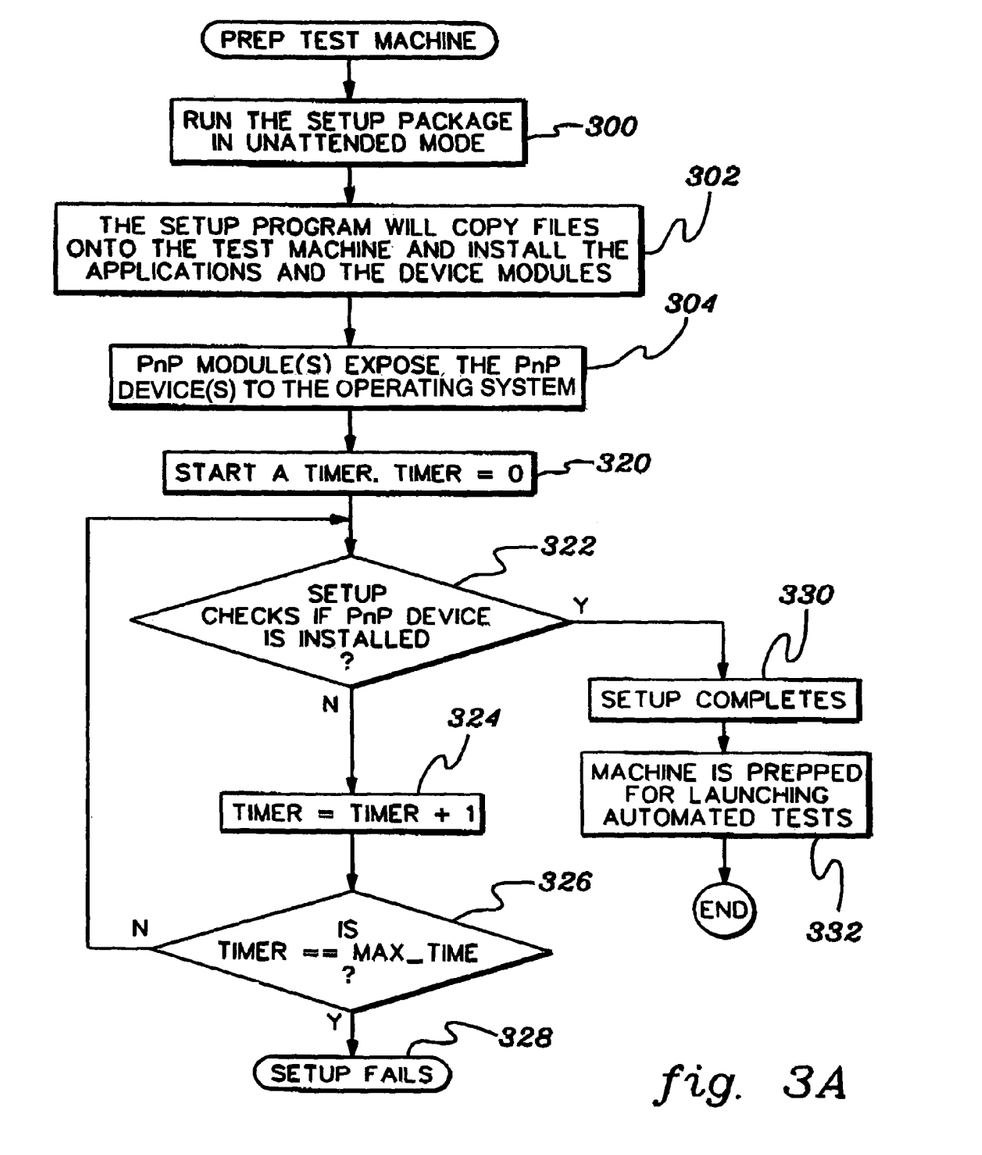
FIG. 3a depicts one embodiment of the logic associated with preparing a test machine for performing automated tests, in accordance with an aspect of the present invention.
Figure 3B:
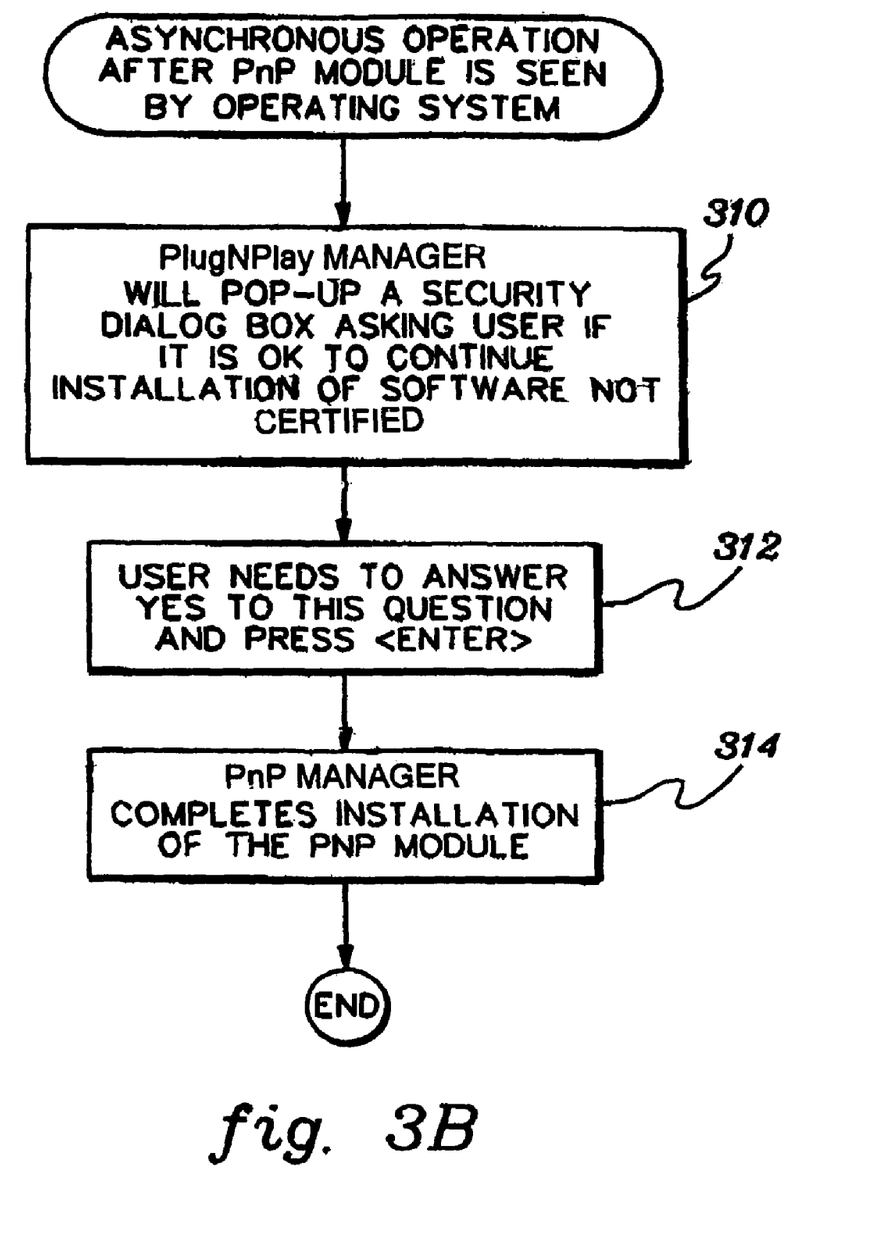
FIG. 3b depicts one embodiment of the logic associated with an asynchronous operation to be performed after a signature required device is seen by the operating system, in accordance with an aspect of the present invention.

Referring initially to FIG. 3a, the prep setup package, which is provided by the build machine, is run on the test machine in unattended mode (i.e., automatically, without user intervention), STEP 300. The setup package copies files onto the test machine and installs the applications and the device modules selected for the setup package, STEP 302. This installation may vary, but in one embodiment, includes placing the binaries in specific locations so that they are found during execution.

Additionally, any PnP modules included in the prep setup package expose the PnP device(s) (e.g., object(s) created in memory) of the PnP modules to the operating system, STEP 304. After a PnP device is seen by the operating system, an asynchronous operation is performed, as described with reference to FIG. 3b. This asynchronous operation enables the installation of unsigned modules that require signature.

Referring to FIG. 3b, in one embodiment, the PlugNPlay Manager provides a pop-up security dialog box asking the user if it is okay to continue installation of software not certified, STEP 310. The user answers yes to this question and presses enter, STEP 312, to continue with preparing the test machine. The PnP Manager then completes installation of the PnP module, STEP 314. This includes, for instance, logging a completion indication. These steps are performed for each PnP module that is installed. However, it is only performed, in one example, when the module is installed and not when it is replaced by an updated module.

Returning to FIG. 3a, asynchronously to the operation performed in FIG. 3b, a timer is started and initialized to zero, STEP 320. Thereafter, a determination is made as to whether the PnP device is installed, INQUIRY 322. If the logic determines that the PnP device is still not installed (e.g., the asynchronous operation has not completed), then the timer is incremented (e.g., by one), STEP 324. Thereafter, a determination is made as to whether the timer is equivalent to a maximum time that is previously set (e.g., 5 minutes or any other desired amount of time), INQUIRY 326. If the timer is not equal to the maximum time, then processing continues with INQUIRY 322. However, if the timer is equal to the maximum time and the PnP device is still not installed, then the setup fails, STEP 328.

Returning to INQUIRY 322, if it is determined that the PnP module(s) is (are) installed, then the setup completes, STEP 330, and the machine is prepared for launching automated tests, STEP 332.

One embodiment of the logic associated with running automated tests on a prepared test machine is described with reference to FIG. 4. In one example, this logic is run daily to test the latest binaries available. No human intervention is needed in this testing. It is assumed in this logic that the PnP modules to be tested have already been installed and that the testing is of updated binaries of those modules. If a brand new (i.e., never installed PnP module) is to be tested, then the operating system prompts for human intervention when the one or more PnP devices of that module are exposed to the operating system.

Figure 4:
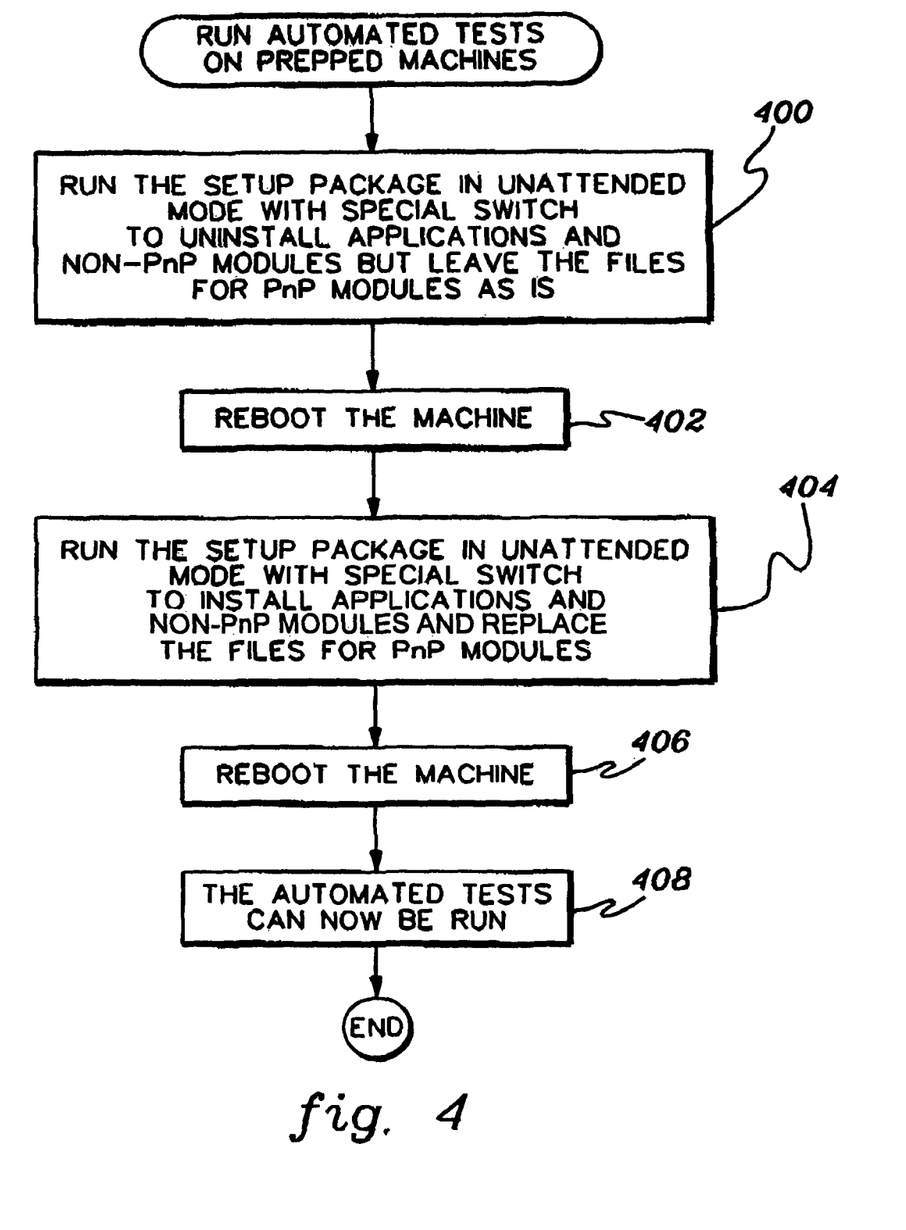
FIG. 4 depicts one embodiment of the logic associated with running automated tests on prepared test machines, in accordance with an aspect of the present invention.

Referring to FIG. 4, initially, the run setup package provided by the build machine is executed on the test machine in unattended mode with a special switch set to uninstall, STEP 400. This switch is, for example, a parameter, referred to as persistPnP. By setting this special switch, the run setup package uninstalls the applications and non-PnP modules on the test machine, but does not uninstall the files for the PnP modules. Instead, it deletes the binary files associated therewith, without uninstalling the modules.

Thereafter, the machine is rebooted, STEP 402. Further, the run setup package is executed in unattended mode with the special switch set to install, STEP 404. This installs the applications and the non-PnP modules on the test machine and replaces the files for the PnP modules. In one example, the PnP driver is copied to a directory from a temporary directory where the setup package has uncompressed the files. For instance, for Windows 2003, the driver file is copied, as is. However, for Windows 2000, xxx.sys.w2k is copied as xxx.sys. Similar logic is used for .INF and .CAT files in the driver set for each PnP device.

Subsequent to installing the applications and/or modules, the machine is rebooted, STEP 406, and automated tests can now be run, STEP 408. That is, tests are automatically executed by, for instance, scripts that test the functionality of the installed modules.

Described in detail above is logic to provide a test sequence for updated signature required modules, such as PnP drivers, for which signatures have yet to be obtained for the updated binaries. To ensure appropriate testing, the following steps are followed, in one embodiment:

1. The automated scripts uninstall the old software modules (except PnP modules) from the test machine with the special switch;
2. The automated scripts restart/reboot the test machine.
3. The automated scripts install the new software modules to be tested on the test machine with the special switch and replace the PnP modules;
4. The automated scripts restart/reboot the test machine; and
5. The automated scripts launch the tests.

Advantageously, one or more aspects of the present invention allow automated daily build and testing of PnP modules (and/or other signature required modules) in a test environment without requiring daily human intervention. Further, advantageously, the build and test are of the most up-to-date modules. That is, there is no delay waiting for signatures of updated signature required modules.

These advantages are distinguished from previous techniques for build and test. For instance, in one previous embodiment of a build process, the technique required the latest PnP drivers to be signed each time a new version was built. Thus, there would be at least a one day delay in completing the build and performing the testing. Further, daily human intervention was required in the build.

In yet another embodiment, the PnP driver was digitally signed with the user's company's digital signature issued by, for instance, Veritas, instead of Microsoft Corporation. In this instance, human intervention was required daily in both the build and test processes.

In still another embodiment, the testing required daily human intervention by requiring the user to answer yes to the pop-up security question. This is in contrast to an aspect of applicants' claimed invention in which this pop-up security question is only asked once during the preparing of the test machine and not during the daily tests.

Advantageously, one or more aspects of the present invention are transparent to the user.

Although one or more examples have been provided herein, these are only examples. Many variations to these examples can be made without departing from the spirit of the present invention. For instance, testing environments other than the example provided herein may include and/or benefit from one or more aspects of the present invention. For example, the testing environment may include only one server, which is responsible for the various tasks performed by the multiple servers described herein. Further, in another embodiment, more or less than three servers may be used. Yet further, the environment may include an operating system other than Windows. Still further, one or more of the processing units may be coupled to a shared storage medium, instead of coupled to one another via a network. Yet further, networks other than those described herein and/or connections other than networks may be used. Still further, one or more of the servers may be different than an xSeries® Server, and/or processing units other than servers may be used. Many other variations exist.

For instance, a data processing system suitable for storing and/or executing program code is usable that includes at least one processor coupled directly or indirectly to memory elements through a system bus. The memory elements include, for instance, local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

Moreover, other signature required devices may be included. Additionally modules in which signatures are not necessarily required, but are desired, may be considered signature required devices for the processing herein. Many other variations exist and are considered a part of the claimed invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating software testing, said method comprising:
    installing original versions of one or more signature required modules, the installing comprising:
        exposing at least one device of the original versions of the one or more signature required modules to an operating system executing on a processor;
        based on the exposing, prompting a user to authorize installation of the original versions of the one or more signature required modules; and
        obtaining authorization from the user that installation of the original versions of the one or more signature required modules is to proceed;
    obtaining, by the processor, an automatically built setup package for a solution that includes a plurality of software modules to be installed on the processor and to be tested together, said plurality of software modules to perform one or more functions and said setup package including one or more updated versions of the one or more signature required modules, the one or more updated versions of the one or more signature required modules being included in the setup package absent a signing of the one or more updated versions of the one or more signature required modules, and wherein said one or more updated versions of the one or more signature required modules are able to be tested as part of the solution absent the signing of the one or more updated versions of the one or more signature required modules; and
    executing the automatically built setup package on the processor to allow installation and testing of the plurality of software modules of the built setup package, the operating system having the previously installed original versions of the one or more signature required modules, and wherein the executing automatically installs the unsigned updated versions of the one or more signature required modules absent operating system prompting for human intervention for the one or more unsigned updated versions of the one or more signature required modules, wherein prompting for human intervention is avoided in the automatic install of the unsigned updated versions of the one or more signature required modules based on the authorization from the user that installation of the original versions of the one or more signature required modules is to proceed.

2. The method of claim 1, further comprising automatically building the setup package, wherein the building is automated in that it lacks human intervention.

3. The method of claim 2, wherein the building comprises selecting one or more binaries to be included in the setup package, said one or more binaries including one or more binaries for the one or more updated versions of the signature required modules and zero or more binaries for zero or more non-signature required modules.

4. The method of claim 3, wherein the selecting comprises selecting the one or more binaries for the one or more updated versions of the signature required modules from a sub-directory for signature required modules.

5. The method of claim 1, wherein the one or more signature required modules comprise at least one plug and play driver.

6. The method of claim 1, wherein executing the setup package:
uninstalls one or more previous versions of one or more non-signature required modules, the uninstalling not affecting one or more previous versions of the one or more signature required modules; and
installs the one or more non-signature required modules, and replaces one or more previous versions of the one or more signature required modules with the one or more updated versions.

7. The method of claim 1, wherein the executing is automated in that it is absent human intervention 8. The method of claim 7, further comprising preparing the processor to enable the automated executing of the setup package.

9. The method of claim 8, wherein the preparing comprises:
executing a prep setup package to perform at least one of copying one or more files onto the processor, installing one or more applications onto the processor, and installing one or more modules onto the processor; and
performing the installing of the original versions of the one or more signature required modules.

10. The method of claim 1, wherein the obtaining and executing are automated and are performable daily.

11. A computer system for facilitating software testing, the computer system comprising:
a memory; and
a processor in communications with the memory, wherein the computer system is configured to perform a method, said method comprising:
installing original versions of one or more signature required modules, the installing comprising:
exposing at least one device of the original versions of the one or more signature required modules to an operating system executing on the processor;
based on the exposing, prompting a user to authorize installation of the original versions of the one or more signature required modules; and
obtaining authorization from the user that installation of the original versions of the one or more signature required modules is to proceed;
obtaining an automatically built setup package for a solution that includes a plurality of software modules to be installed on the processor and to be tested together, said plurality of software modules to perform one or more functions and said setup package including one or more updated versions of the one or more signature required modules, the one or more updated versions of the one or more signature required modules being included in the setup package absent a signing of the one or more updated versions of the one or more signature required modules, and wherein said one or more updated versions of the one or more signature required modules are able to be tested as part of the solution absent the signing of the one or more updated versions of the one or more signature required modules; and
executing the automatically built setup package on the processor to allow installation and testing of the plurality of software modules of the built setup package, the operating system having the previously installed original versions of the one or more signature required modules, and wherein the executing automatically installs the unsigned updated versions of the one or more signature required modules absent operating system prompting for human intervention for the one or more unsigned updated versions of the one or more signature required modules, wherein prompting for human intervention is avoided in the automatic install of the unsigned updated versions of the one or more signature required modules based on the authorization from the user that installation of the original versions of the one or more signature required modules is to proceed.

12. The computer system of claim 11, wherein the setup package comprises one or more binaries selected to be included in the setup package, said one or more binaries including one or more binaries for the one or more updated versions of the signature required modules and zero or more binaries for zero or more non-signature required modules.

13. The computer system of claim 11, wherein the executing:
uninstalls one or more previous versions of one or more non-signature required modules, said uninstall not affecting one or more previous versions of the one or more signature required modules; and
installs the one or more non-signature required modules, and replaces one or more previous versions of the one or more signature required modules with the one or more updated versions.

14. The computer system of claim 13, wherein the method further comprises preparing the processor to enable automated executing of the setup package, and wherein the preparing comprises:
executing a prep setup package to perform at least one of copying one or more files onto the processor, installing one or more applications onto the processor, and installing one or more modules onto the processor; and
performing the installing of the original versions of the one or more signature required modules.

15. A computer program product for facilitating software testing, the computer program product comprising:
a non-transitory computer readable storage medium readable by a processing circuit and storing instructions for execution by the processing circuit for performing a method comprising:
installing original versions of one or more signature required modules, the installing comprising:

exposing at least one device of the original versions of the one or more signature required modules to an operating system executing on a processor;

based on the exposing, prompting a user to authorize installation of the original versions of the one or more signature required modules; and obtaining authorization from the user that installation of the original versions of the one or more signature required modules is to proceed;

obtaining, by the processor, an automatically built setup package for a solution that includes a plurality of software modules to be installed on the processor and to be tested together, said plurality of software modules to perform one or more functions and said setup package including one or more updated versions of the one or more signature required modules, the one or more updated versions of the one or more signature required modules being included in the setup package absent a signing of the one or more updated versions of the one or more signature required modules, and wherein said one or more updated versions of the one or more signature required modules are able to be tested as part of the solution absent the signing of the one or more updated versions of the one or more signature required modules; and executing the automatically built setup package on the processor to allow installation and testing of the plurality of software modules of the built setup package, the operating system having the previously installed original versions of the one or more signature required modules, and wherein the executing automatically installs the unsigned updated versions of the one or more signature required modules absent operating system prompting for human intervention for the one or more unsigned updated versions of the one or more signature required modules, wherein prompting for human intervention is avoided in the automatic install of the unsigned versions of the one or more signature required modules based on the authorization from the user that installation of the original versions of the one or more signature required modules is to proceed.

16. The computer program product of claim 15, wherein the method further comprises automatically building the setup package, the automatically building comprising selecting one or more binaries to be included in the setup package, said one or more binaries including one or more binaries for the one or more updated versions of the signature required modules and zero or more binaries for zero or more non-signature required modules.

17. The computer program product of claim 15, wherein the executing includes:

uninstalling one or more previous versions of one or more non-signature required modules, the uninstalling not affecting one or more previous versions of the one or more signature required modules; and installing the one or more non-signature required modules, and replace one or more previous versions of the one or more signature required modules with the one or more updated versions.

18. The computer program product of claim 17, wherein the method further comprises preparing the processing unit to enable automated execution of the setup package, and wherein the preparing comprises:

executing a prep setup package to perform at least one of copying one or more files onto the processor, installing one or more applications onto the processor, and installing one or more modules onto the processor; and performing the installing of the original versions of the one or more signature required modules.

* * * * *